United States Patent
Fröhlich

(10) Patent No.: US 11,860,053 B2
(45) Date of Patent: Jan. 2, 2024

(54) TORQUE SENSOR DEVICE, METHOD FOR DETERMINING A TORQUE, STATOR AND STATOR ARRANGEMENT

(71) Applicant: Valeo Schalter und Sensoren GmbH, Bietigheim-Bissingen (DE)

(72) Inventor: Ekkehart Fröhlich, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 208 days.

(21) Appl. No.: 17/268,333

(22) PCT Filed: Jul. 22, 2019

(86) PCT No.: PCT/EP2019/069619
§ 371 (c)(1),
(2) Date: Feb. 12, 2021

(87) PCT Pub. No.: WO2020/035262
PCT Pub. Date: Feb. 20, 2020

(65) Prior Publication Data
US 2021/0302246 A1    Sep. 30, 2021

(30) Foreign Application Priority Data

Aug. 15, 2018   (DE) ............... 10 2018 119 807.8

(51) Int. Cl.
*G01L 3/10*     (2006.01)

(52) U.S. Cl.
CPC .................... *G01L 3/104* (2013.01)

(58) Field of Classification Search
CPC ........... G01L 3/104; G01L 3/105; B62D 6/10; B62D 5/04
See application file for complete search history.

(56) References Cited

U.S. PATENT DOCUMENTS

| 6,912,923 B2 * | 7/2005 | Froehlich | ............... G01L 3/104 |
| | | | 73/862.331 |
| 9,347,843 B2 * | 5/2016 | Franz | ..................... G01L 5/221 |

(Continued)

FOREIGN PATENT DOCUMENTS

| CN | 103808443 B * | 8/2017 | ............... B62D 6/10 |
| DE | 10256321 A1 | 6/2004 | |

(Continued)

OTHER PUBLICATIONS

First Office Action in corresponding Chinese Application No. 201980066481.7, dated Feb. 17, 2022 (12 pages).

(Continued)

*Primary Examiner* — Octavia Davis Hollington
(74) *Attorney, Agent, or Firm* — Osha Bergman Watanabe & Burton LLP

(57) ABSTRACT

A torque sensor device for detecting a torque applied to a shaft, includes a magnetic arrangement, a stator arrangement and a magnetic sensor arrangement. The magnetic arrangement is configured for generating at least one magnetic field. A magnetic flux can be generated in the stator arrangement. The magnetic arrangement and the stator arrangement are movable relative to each other in the circumferential direction. The magnetic arrangement and the stator arrangement are arranged relative to each other so that, by a relative movement between the magnetic arrangement and the stator arrangement in the circumferential direction about a center axis of the torque sensor device, a first magnetic flux with a first magnetic flux direction and a second magnetic flux with a second flux direction opposite to the first flux direction can be generated in the stator arrangement.

21 Claims, 7 Drawing Sheets

(56) References Cited

U.S. PATENT DOCUMENTS

Figure 1:
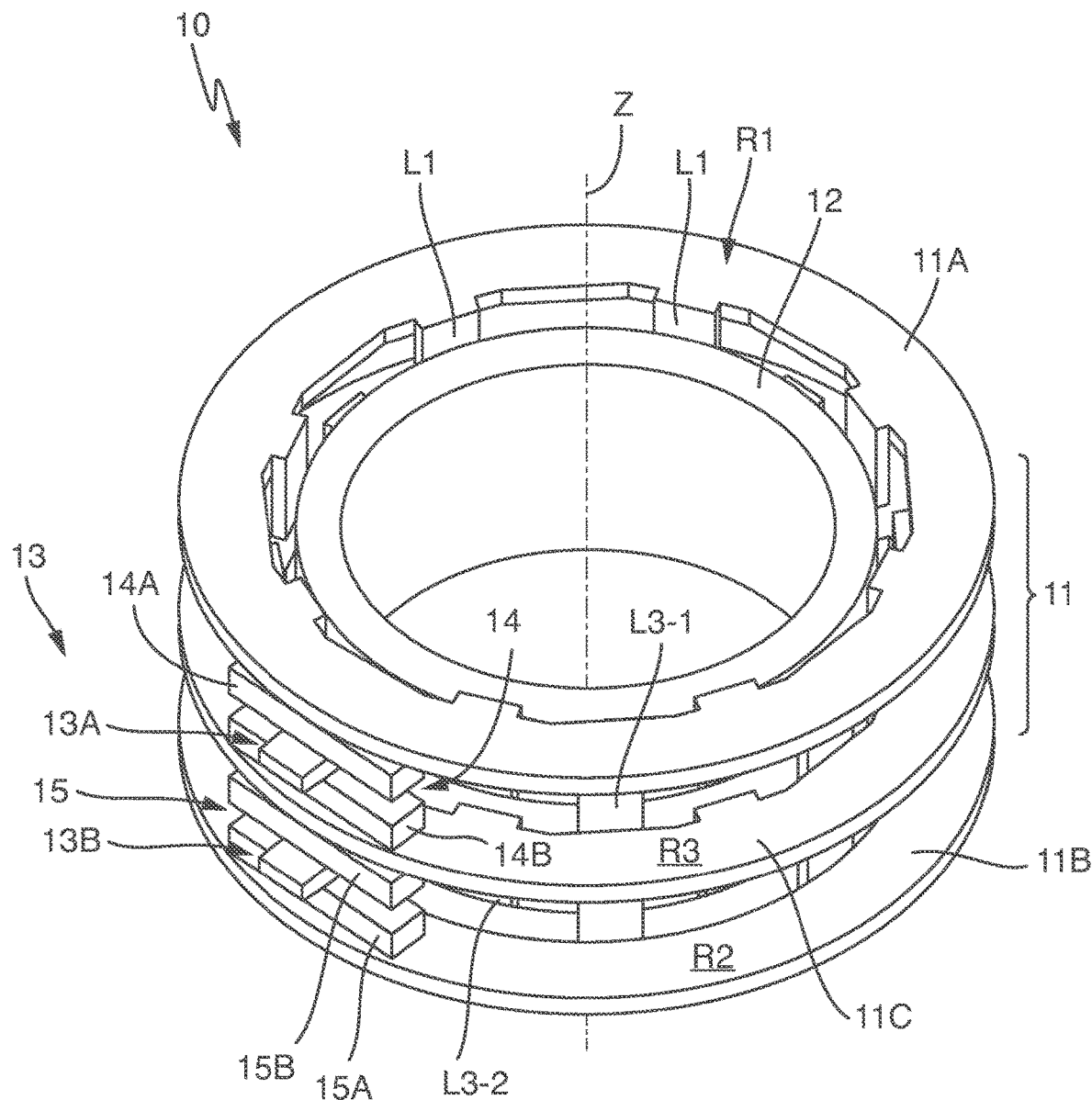

2010/0005909 A1     1/2010    Antoni et al.
2016/0091574 A1     3/2016    Xu et al.

FOREIGN PATENT DOCUMENTS

| | | | | |
|---|---|---|---|---|
| DE | 102007057050 A1 | | 7/2008 | |
| DE | 102012104076 A1 | | 11/2012 | |
| DE | 102013006379 A1 | | 10/2014 | |
| DE | 102016100236 A1 | * | 7/2017 | ............. G01L 3/104 |
| EP | 1269133 B1 | | 5/2004 | |
| JP | 2005069995 A | * | 3/2005 | |
| JP | 2008241589 A | * | 10/2008 | |
| JP | 2011017647 A | * | 1/2011 | |
| JP | 2013195288 A | * | 9/2013 | |
| JP | 2022015064 A | * | 1/2022 | |
| KR | 20100105990 | * | 10/2010 | |

OTHER PUBLICATIONS

International Search Report and Written Opinion issued in corresponding International Patent Application No. PCT/EP2019/069619, dated Oct. 18, 2019 (10 pages).

German Search Report issued in corresponding German Application No. 10 2018 119 807.8, dated Jun. 14, 2019 (5 pages).

\* cited by examiner

TORQUE SENSOR DEVICE, METHOD FOR DETERMINING A TORQUE, STATOR AND STATOR ARRANGEMENT

The invention relates to a torque sensor device for detecting a torque applied to a shaft, in particular for detecting a torque applied to a steering shaft of a motor vehicle, wherein the torque sensor device has a magnetic arrangement, a stator arrangement and a magnetic sensor arrangement.

Furthermore, the invention relates to a method for determining a torque applied to a shaft by means of a torque sensor device.

The invention moreover relates to a stator and to a stator arrangement for a torque sensor device.

Torque sensor devices of the type in question, in particular for steering shafts of motor vehicles, are basically known from the prior art, for example from DE 10 2013 006 379 A1 or EP 1 269 133 B1.

Torque sensor devices of this type are used, for example, in electrical steering systems in order to activate the electrical driving motor of the steering system on the basis of a steering torque applied by a driver, for example in order to provide corresponding steering assistance.

Generally, for this purpose, torque sensor devices are used in conjunction with an axially divided shaft and with a torsion bar of defined, known torsional rigidity, wherein the torsion bar connects a first part of the axially divided shaft to a second part of the axially divided shaft.

If a torque is applied to the shaft, this causes torsion of the two parts of the shaft with respect to each other by a measurable angle of torsion, wherein the angle of torsion arises depending on the applied torque and the rigidity of the torsion bar, and therefore the applied torque can be determined from the detected angle of torsion when the rigidity of the torsion bar is defined and known.

Various measuring principles and sensor arrangements are known for measuring the angle of torsion resulting from an applied torque, wherein use is very frequently made of magnetic sensor devices or systems in which a magnetic arrangement having at least one magnetic element, generally having an encircling ring magnet in the form of a permanent magnet, is connected to the first part of the steering shaft for rotation therewith, and a stator arrangement having one or more magnetically conductive stators is connected to the second part of the shaft for rotation therewith, wherein the stator arrangement is generally arranged in the radial direction concentrically about the magnetic arrangement, in particular the magnetic element, with a small air gap in between. The magnetic flux of a magnetic field generated by means of the magnetic arrangement can be conducted via the stator arrangement, which conventionally comprises two separate stators having in each case a region in the shape of an annular disc, to a magnetic sensor arrangement having at least one magnetic sensor, for example a Hall sensor, and evaluated.

If the magnetic arrangement connected to the first part of the shaft for rotation therewith, in particular the magnetic element of said magnetic arrangement, is moved by a rotational movement of the shaft relative to the stator arrangement connected to the second part of the shaft, the magnetic flux density in the stator arrangement, in particular in the individual stators, changes, which can be detected by means of the magnetic sensor arrangement. The change in the magnetic flux density in the stator arrangement is dependent here, inter alia, on the size of the relative movement of the magnetic arrangement, in particular of the respective magnetic elements, in relation to the stator arrangement, in particular in relation to the individual stators, i.e. on the angle of torsion. A conclusion can thus be drawn regarding the angle of torsion from the change in the detected flux density and, from the angle of torsion in turn, with knowledge of the torsional rigidity of the torsion bar, the torque applied to the shaft can be determined.

By superimposition of the magnetic field generated by the magnetic arrangement of the torque sensor device with a further magnetic field, for example a magnetic field of a further sensor device or a magnetic interference field which is present in the surroundings of the torque sensor device and is generated, for example, by electrical machines located in the vicinity, such as, for example, electric motors or generators, or high-current lines, the flux transmitted to the magnetic sensor device may be influenced, in particular undesirably, and, in particular, the transmitted flux density may be changed by the magnetic interference field, leading to an erroneous, but plausible, sensor signal that is therefore not recognized as being incorrect, and consequently leading to an erroneous torque value.

In order to compensate for interference caused by a magnetic field of a further sensor device, what is referred to as "crosstalk", US 2016/0091574 A1 proposes providing at least one additional magnetic element which is arranged symmetrically with respect to the magnetic element of the further sensor device, in order to compensate for the influence of the magnetic field of the magnetic element of the further sensor device on the actual sensor device. However, this requires, in particular, knowing the direction of the interfering magnetic field.

It is an object of the invention to provide an alternative, in particular improved, torque sensor device, in particular a torque sensor device where the influence of at least one external magnetic interference field, which is present in the surroundings of the torque sensor device, on a torque value to be determined is reduced. It is a further object to provide an alternative, in particular improved, method for determining a torque applied to a shaft, and also an alternative, in particular improved stator, and an alternative, in particular improved, stator arrangement, for an alternative, in particular improved, torque sensor device.

This object is achieved by a torque sensor device according to the invention, by a method according to the invention, by a stator according to the invention and by a stator arrangement according to the invention having the features according to the respective independent patent claims. Advantageous embodiments of the invention are the subject matter of the dependent patent claims, the description and the figures, and will be explained in more detail below.

A torque sensor device according to the invention for detecting a torque applied to a shaft, in particular for detecting a torque applied to a steering shaft of a motor vehicle has a magnetic arrangement, a stator arrangement and a magnetic sensor arrangement, wherein the magnetic arrangement is configured for generating at least one magnetic field, wherein a magnetic flux can be generated in the stator arrangement, and wherein the magnetic arrangement and the stator arrangement are movable relative to each other in the circumferential direction.

According to the invention, the magnetic arrangement and the stator arrangement are configured and arranged relative to each other in such a manner that, by means of a relative movement between the magnetic arrangement and the stator arrangement in the circumferential direction about a centre axis of the torque sensor device, a first magnetic flux with a first magnetic flux direction and, in particular simultaneously, a second magnetic flux with a second flux direction opposite to the first flux direction can be generated in the stator arrangement.

The stator arrangement is configured here to conduct the first magnetic flux generated in the stator arrangement and the second magnetic flux generated in the stator arrangement to the magnetic sensor device. The magnetic sensor arrangement of a torque sensor device according to the invention comprises a first magnetic sensor for detecting the first magnetic flux and a second magnetic sensor for detecting the second magnetic flux.

In a particularly advantageous refinement of a torque sensor device according to the invention, the magnetic arrangement and the stator arrangement are configured and arranged relative to each other in such a manner that the first magnetic flux generated and the second magnetic flux are identical in magnitude or have the same strength, i.e. are identical in size, and are merely oriented in opposite directions.

Torque devices for detecting a torque applied to a shaft, in particular for detecting a torque applied to a steering shaft of a motor vehicle, in particular the design and function of said torque devices, are basically known to a person skilled in the art from the prior art. In particular from DE 10 2013 006 379 A1 or EP 1 269 133 B1, to which reference is hereby expressly made for further information regarding the basic function and the basic design of a torque sensor device according to the invention.

A torque sensor device according to the invention is preferably configured here for detecting a torque applied to a shaft, wherein the shaft has a first part and a second part, which is twistable relative to the first part, and in particular the first part and the second part of the shaft are connected to each other by means of a torsion bar. A torque sensor device according to the invention is preferably configured here for detecting the torsion of the first part of the shaft in relation to the second part of the shaft. The applied torque can be determined from the detected torsion of the shaft when the torsional rigidity of the torsion bar of the shaft is known.

The magnetic arrangement preferably has at least one magnetic element for generating at least one magnetic field and in particular the at least one magnetic element of the magnetic arrangement can be arranged, in particular concentrically with respect to the shaft, i.e. in such a manner that the centre axis of the torque sensor device is aligned with the axis of rotation of the shaft, wherein the magnetic arrangement, in particular the at least one magnetic element of the magnetic arrangement, is connectable in particular to a first part of the shaft for rotation therewith.

The at least one magnetic element of the magnetic arrangement is preferably a permanent magnet, in particular a completely closed ring magnet or a magnet which is similar to a ring magnet and is virtually closed in the circumferential direction, wherein the magnetic element has in particular a plurality of ring magnet segments of opposite polarity or corresponding pairs of poles which are arranged abutting one another in each case with opposite polarity in the circumferential direction, wherein in particular two mutually adjacent sections of opposite polarity form a pair of poles. The number of the pairs of poles in the circumferential direction particularly preferably corresponds to the number of the tabs of the first and/or the second stator.

If the magnetic arrangement has one or more further magnetic elements, the latter are particularly preferably likewise configured as previously described and are in particular arranged concentrically with respect to the at least one magnetic element.

Here, within the context of the invention, a "magnet which is similar to a ring magnet" is understood as meaning a magnet, in particular a permanent magnet, which, although not completely closed in the circumferential direction, is configured in such a manner that it virtually, in particular completely, acts like a completely closed ring magnet.

The stator arrangement can preferably likewise be arranged concentrically with respect to the shaft and in particular is connectable to a second part of the shaft for rotation therewith.

In an advantageous refinement of a torque sensor device according to the invention, the stator arrangement is in particular at least partially arranged concentrically with respect to the magnetic arrangement, in particular with respect to the at least one magnetic element, wherein the stator arrangement is in particular at least partially arranged on the outside around the magnetic arrangement, preferably around the at least one magnetic element and in particular with a defined air gap in between.

The stator arrangement serves in particular, and is preferably configured, to conduct a magnetic flux of the magnetic field generated by the magnetic arrangement to the magnetic sensor arrangement.

For focusing, in particular for amplifying, and for transmitting the magnetic flux from the stator arrangement to the first magnetic sensor arrangement, it can be advantageous if the torque sensor device has in particular at least one flux conductor, preferably at least two flux conductors arranged parallel to and spaced apart from one another. This enables the torque sensor device to have better resolution and thus better accuracy. Preferably, at least one of the flux conductors is arranged on the stator arrangement and fastened either directly to the stator arrangement or indirectly via a holder. However, the flux conductor or the flux conductors can also be arranged on a housing of the torque sensor device.

At least one magnetic sensor, preferably both magnetic sensors of the magnetic sensor arrangement, is/are in particular a simple Hall sensor with which a magnetic flux density, running perpendicularly to the sensor surface of the Hall sensor, of a magnetic field, or a portion of the magnetic flux density, running perpendicularly to the sensor surface, of the magnetic field can be detected, wherein, particularly preferably, at least the first magnetic sensor, in particular all the magnetic sensors of the first receiving device, is/are arranged fixed on the housing, i.e. in a stationary or positionally fixed manner in relation to the rotatable shaft.

In an advantageous refinement of a torque sensor device according to the invention, the torque sensor device in particular also has a control device which is configured to determine a torque applied to a shaft, which is functionally connected to the torque sensor device, in accordance with the magnetic fluxes detected by means of the magnetic sensor arrangement.

By means of the refinement according to the invention of the torque sensor device and the magnetic fluxes thereby generated in opposite directions, a magnetic interfering flux which acts in the direction of the first magnetic flux or of the second magnetic flux, i.e. in the direction of a sensor useful signal characterizing a torque value, can be removed, in particular can disappear by averaging, by means of a simple calculation of the difference between the sensor signals generated by means of the magnetic sensor arrangement, in particular by means of a calculation of the difference between a first sensor signal generated by means of the first magnetic sensor and a second sensor signal generated by means of the second magnetic sensor.

In an advantageous refinement of a torque sensor device according to the invention, the stator arrangement has in particular a first stator, a second stator and a third stator which are each arranged concentrically with respect to one another along the centre axis, wherein the third stator is arranged in the axial direction, with respect to the centre axis of the stator arrangement, between the first stator and the second stator, wherein, by means of a relative movement between the magnetic arrangement and the stator arrangement in the circumferential direction, the first magnetic flux with the first magnetic flux direction can be generated between the first stator and the third stator in the stator arrangement and, in particular simultaneously, the second magnetic flux with the second flux direction opposite to the first flux direction can be generated between the second stator and the third stator in the stator arrangement.

In a particularly advantageous refinement of a torque sensor device according to the invention, the magnetic arrangement and the stator arrangement are in particular configured and arranged relative to each other in such a manner that the first magnetic flux and the second magnetic flux are in each case generated such that the first flux direction and the second magnetic flux direction run in an opposite manner with respect to each other and in each case parallel to the centre axis of the stator arrangement. This permits a particularly simple refinement of a torque sensor device according to the invention which is configured for compensating for an external magnetic interference field, in particular a torque sensor device which is configured for compensating for an external interference field acting in the flux direction of a useful signal.

In an advantageous refinement of a torque sensor device according to the invention, the first and/or the second stator has/have a stator body in particular in the shape of an annular disc and tabs which extend away from said stator body in an axial direction, wherein the tabs are arranged distributed in particular in the circumferential direction, in particular uniformly distributed with spacings in between.

In an advantageous refinement of a torque sensor device according to the invention, the stator body of the first and/or the second stator in particular in each case has a radially inner edge and a radially outer edge, wherein the tabs in particular extend away from the radially inner edge of the stator body in the shape of an annular disc, in particular all to the same side, i.e. in a same direction.

In an advantageous refinement of a torque sensor device according to the invention, the first stator and the second stator in particular each comprise a stator body in the shape of an annular disc and tabs which extend in each case away from the associated stator body in an axial direction, wherein the first stator and the second stator are configured and arranged in such a manner that the tabs of the first stator and of the second stator each extend in the axial direction from the associated stator body in the direction of the third stator.

The directional specification "axially" refers here in each case in a conventional manner in the art to a direction parallel to the axis of rotation of the shaft or to a direction parallel to the centre axis of the torque sensor device, the directional specification "circumferential direction" correspondingly refers to a direction of rotation about said axis of rotation or centre axis, the directional specification "radially" refers to a direction which is perpendicular to the axial and circumferential direction. The directional specification "tangentially" correspondingly refers to a direction which is perpendicular to the axial direction and the radial direction.

In an advantageous refinement of a torque sensor device according to the invention, the third stator in particular comprises a stator ring and first tabs and second tabs, wherein the first tabs and second tabs each extend away from the stator ring of the third stator in opposite axial directions. The first tabs extend here in particular away from the stator ring in a first axial direction and the second tabs away from the stator ring in a second axial direction opposite to the first axial direction. An axially particularly compact torque sensor device can thereby be achieved.

In an advantageous refinement of a torque sensor device according to the invention, in particular the first tabs and the second tabs of the third sensor are in particular arranged in each case distributed in the circumferential direction, in particular uniformly and with spacings in between.

In an advantageous refinement of a torque sensor device according to the invention, the third stator has in particular twice the number of tabs than the first stator and the second stator, but in particular in each case an equal number of first and second tabs. That is to say, the number of first tabs of the third stator preferably corresponds to the number of tabs of the first stator and/or to the number of tabs of the second stator, wherein the number of tabs of the first stator and the number of tabs of the second stator is in particular the same.

For torque sensor devices for steering shafts of motor vehicles, in particular for use in passenger vehicles, 8 tabs for the first stator and the second stator and a total of 16 tabs (8 first tabs and 8 second tabs) for the third stator have proven particularly advantageous. However, other configurations, for example 6 tabs for the first stator and the second stator and 12 tabs for the third stator, are likewise possible, depending on the diameter of the steering shaft and the desired measuring range.

In an advantageous refinement of a torque sensor device according to the invention, the first tabs and the second tabs of the third stator are arranged in particular in each case at least partially offset from one another, in particular in each case completely offset from one another, in the circumferential direction.

In an advantageous refinement of a torque sensor device according to the invention, the first tabs and the second tabs of the third stator are arranged in particular at least partially overlapping, preferably completely overlapping, in the circumferential direction, in particular in alignment with one another in the axial direction.

That is to say that preferably the first tabs and the second tabs of the third stator are arranged in an alternating manner in the circumferential direction at least over part of the circumference of the stator, preferably over the entire circumference of the stator, in particular without overlapping. Alternatively, the first tabs and second tabs can also be arranged, however, overlapping in the circumferential direction, in particular in alignment with one another in the axial direction.

The former offset arrangement has the advantage that the stator can be produced particularly simply and cost-effectively, in particular as a simple punched and bent part, wherein the tabs can be punched out together with the stator body and can then be bent over correspondingly in the respective associated axial direction, first tabs, for example, "upwards" and second tabs "downwards".

The latter, in particular aligned, arrangement has the advantage that a magnetic arrangement with constant polarity in the axial direction can be used; in particular, a single, sleeve-shaped magnetic element with constant polarity in the axial direction, which magnetic element extends over the axial length of the stator and has alternating polarity in the circumferential direction, is sufficient in order, in a torque sensor device according to the invention, to generate the first magnetic flux and the second magnetic flux in opposite directions. A magnetic element of this type can be produced particularly simply and therefore cost-effectively.

In an advantageous refinement of a torque sensor device according to the invention, the first tabs of the third stator are arranged offset from the tabs of the first stator in particular in the circumferential direction and engage in particular in a meshing manner in spacings between the tabs of the first stator and/or the second tabs of the third stator are arranged offset from the tabs of the second stator in the circumferential direction and engage in particular in a meshing manner in spacings between the tabs of the second stator. In particular the first tabs of the third stator engage in a meshing manner in tabs of the first stator, and the second tabs of the third stator engage preferably in a meshing manner in tabs of the second stator. A particularly compact arrangement of the stator arrangement in the axial direction and good transmission of the magnetic flux can thereby be achieved.

In an advantageous refinement of a torque sensor device according to the invention, the stator ring of the third stator is formed in particular by a stator body which is arranged concentrically with respect to the centre axis, extends in the radial direction and is in the shape of an annular disc, and the first tabs and the second tabs extend away from said stator body, in particular in opposite axial directions. With such a stator, a torque sensor device according to the invention can be formed in a particularly simple manner, in particular a torque sensor device which is particularly compact in the axial direction and requires only few components.

In an advantageous refinement of a torque sensor device according to the invention, the first tabs and the second tabs are formed in particular as a single piece with the stator body. This permits a particularly compact and in some cases also weight-saving stator arrangement and requires very few manoeuvres for assembling a torque sensor device according to the invention.

With a stator of this type, a torque sensor device according to the invention can be formed in a particularly simple manner.

In an advantageous refinement of a torque sensor device according to the invention, the stator body of the third stator has in particular a radially inner edge and a radially outer edge, wherein the first tabs and the second tabs in particular in each case extend away from the radially inner edge of the stator body, which is in the shape of an annular disc, in particular in opposite axial directions.

With a stator of this type, a torque sensor device according to the invention can be formed in a particularly simple manner.

In an alternative, but in some cases likewise advantageous refinement of a torque sensor device according to the invention, the stator ring of the third stator comprises in particular a first stator body which is arranged concentrically with respect to the centre axis, extends in the radial direction and is in the shape of an annular disc, and a second stator body which is arranged concentrically with respect to the centre axis, extends in the radial direction and is in the shape of an annular disc, wherein the first tabs of the third stator are connected to the first stator body, in particular are formed as a single piece/integrally therewith, and extend away from the first stator body, and wherein the second tabs of the third stator are connected to the second stator body, in particular are formed as a single piece/integrally therewith, and extend away from the second stator body.

In an advantageous refinement of a torque sensor device according to the invention, the first stator body and the second stator body are arranged spaced apart from each other in particular in the axial direction. That is to say, alternatively to the previously described embodiment with only one stator body in the shape of an annular disc, from which the tabs extend in opposite axial directions, the third stator can also be formed by two stators, in particular two stators, which are in each case configured as a first stator or second stator and are in each case arranged with their tabs facing away from one another. This makes it possible in a simple manner, in particular on the basis of existing components or assemblies, to provide a torque sensor device which permits compensation for an external magnetic interference field.

In an alternative, in some cases likewise advantageous refinement of a torque sensor device according to the invention, the torque sensor device has in particular two torque sensor assemblies which are arranged one above another in the axial direction and are known from the prior art, for example two in each case identical torque sensor assemblies, configured, for example, according to DE 10 2013 006 379 A1 or EP 1 269 133 B1, with in each case at least one magnetic element, two stator elements and at least one associated magnetic sensor, wherein the third stator is in each case formed by the two adjacent middle stators, wherein the two torque sensor assemblies are in particular configured and arranged in such a manner that a relative movement between the stator elements and the magnet of the respective assembly generates a magnetic flux which is transmitted to the associated magnetic sensor, and wherein the two assemblies are in each case arranged relative to each other in such a manner that, according to the invention, a first magnetic flux with a first flux direction and, in particular simultaneously, a second magnetic flux with a second, opposite flux direction are generated. This makes it possible in a simple manner, in particular on the basis of existing components or assemblies, to provide a torque sensor device which permits compensation for an external magnetic interference field.

In an advantageous refinement of a torque sensor device according to the invention, the magnetic arrangement has in particular a magnetic element which extends in the axial direction in particular over an entire axial length of the third stator, in particular along the first and the second tabs in the axial direction. This makes it possible to provide a torque sensor device which requires only one magnetic element.

In an advantageous refinement of a torque sensor device according to the invention, in particular a polarity of the magnetic arrangement, in particular of the at least one magnetic element, is constant in the axial direction. This makes it possible to produce the magnetic element particularly simply and thus cost-effectively. In this case, the first tabs and the second tabs of the third stator are arranged in particular in each case in alignment over the circumference in the axial direction in order in particular to generate the first magnetic flux and the second magnetic flux with opposite flux directions.

In a particularly advantageous refinement of a torque sensor device according to the invention, in particular a polarity of the magnetic arrangement, in particular of the at least one magnetic element, is constant in the axial direction, and the torque sensor device furthermore has a third stator, the first tabs and second tabs of which are arranged completely overlapping in the circumferential direction, in particular in alignment with one another in the axial direction, wherein the first tabs and the second tabs of the third stator in each case at least partially overlap sections of different polarity in particular in the circumferential direction.

In an advantageous, in particular alternative, refinement of a torque sensor device according to the invention, the magnetic arrangement has in particular a first section extending in the axial direction and a second section extending in the axial direction, wherein, at at least one position in the circumferential direction of the magnetic arrangement, in particular at each position in the circumferential direction, the polarity of the first axial section at this position is opposite to the polarity of the second axial section at this position.

The first section extends here in particular in the axial direction along the first tabs of the third stator. The second section extends in particular in the axial direction along the second tabs of the third stator. This permits the production of the third stator as a punched and bent part which in this case has first and second tabs arranged offset in the circumferential direction in order to generate the first magnetic flux and the second magnetic flux with opposite flux directions.

In a development, the magnetic arrangement in particular has a first section extending in the axial direction and a second section extending in the axial direction, wherein, at at least one position in the circumferential direction of the magnetic arrangement, in particular at each position in the circumferential direction, the polarity of the first axial section at this position is opposite to the polarity of the second axial section at this position, wherein the torque sensor device furthermore has a third stator, the first tabs and second tabs of which are arranged in each case at least partially offset from one another, in particular in each case completely offset from one another, in the circumferential direction, wherein the first tabs and the second tabs of the third stator in each case at least partially overlap sections of different polarity in particular in the circumferential direction.

In an advantageous refinement of a torque sensor device according to the invention, the first axial section and the second axial section in particular abut each other in the axial direction and are in particular part of a common magnetic element, in particular part of a magnetic element extending in the axial direction over an entire axial length of the third stator. This makes it possible to achieve a particularly compact configuration in the axial direction.

In an advantageous refinement of a torque sensor device according to the invention, the magnetic arrangement comprises a single magnetic element with two axial sections which each have poles arranged in an alternating manner in the circumferential direction, wherein the two axial sections are arranged offset from one another in the circumferential direction by a pole such that always opposite poles are adjacent in the axial direction, in particular abutting one another. This makes it possible to achieve a particularly compact configuration in the axial direction.

In an advantageous refinement of a torque sensor device according to the invention, in particular at least one magnetic sensor of the magnetic sensor arrangement, in particular both magnetic sensors, is/are a wired magnetic sensor with connection pins, wherein the magnetic sensor is arranged in the axial direction between the third stator and one of the other two stators, and in particular is arranged in such a manner that the connection pins point outwards in the radial direction. This makes it possible to achieve a compact arrangement with wired magnetic sensors.

In an advantageous refinement of a torque sensor device according to the invention, the connection pins in particular of at least one wired magnetic sensor are soldered onto a printed circuit board, in particular onto a printed circuit board which is arranged oriented with its printed circuit board plane parallel to the centre axis of the stator arrangement or of the torque sensor device. Alternatively, the connection pins can also be connected to a leadframe, in particular can be plugged directly into the latter, in particular to a leadframe which is arranged oriented with its leadframe plane parallel to the centre axis of the stator arrangement. This makes it possible to achieve a compact arrangement and connection to a printed circuit board with wired magnetic sensors.

In an alternative refinement of a torque sensor device according to the invention, in particular at least one magnetic sensor of the magnetic sensor arrangement, in particular both magnetic sensors, is/are an SMD magnetic sensor, wherein the magnetic sensor is arranged in particular in the axial direction level with the third stator and is arranged in particular on a printed circuit board which is arranged with its printed circuit board plane oriented normally with respect to the centre axis of the stator arrangement or of the torque sensor device. This makes it possible to achieve a compact arrangement and connection to a printed circuit board with SMD magnetic sensors.

"SMD" stands for Surface-Mounted Device (surface-mounted element), wherein, in contrast to previously described "wired" components which are provided for "Through Hole Technology, THT", SMD components do not have any wire connections but instead can be soldered directly onto a printed circuit board by means of solderable connection surfaces.

In an advantageous refinement of a torque sensor device according to the invention, the torque sensor device has in particular a first pair of flux conductors with two flux conductors for focusing, in particular for amplifying, and for transmitting the first magnetic flux to the magnetic sensor arrangement, in particular to the first magnetic sensor, and a second pair of flux conductors with two flux conductors for focusing, in particular for amplifying, and for transmitting the second magnetic flux to the magnetic sensor arrangement, in particular to the second magnetic sensor, wherein in particular at least two of the flux conductors are geometrically identical or are identical parts.

In an advantageous refinement of a torque sensor device according to the invention, in particular at least one flux conductor is a punched part or a punched and bent part, preferably all the flux conductors. This permits a particularly simple, cost-effective and, with regard to the geometry, flexible production of the flux conductors.

In an advantageous refinement of a torque sensor device according to the invention, in particular if the two magnetic sensors of the magnetic sensor arrangement are wired magnetic sensors, in particular the two flux conductors of the first pair of flux conductors and/or of the second pair of flux conductors are in each case geometrically identical or are identical parts, wherein in particular all the flux conductors are geometrically identical, in particular are identical parts. This gives rise to a potential cost reduction.

In an advantageous refinement of a torque sensor device according to the invention, in particular at least one flux conductor of the first pair of flux conductors and one flux conductor of the second pair of flux conductors are identical or are identical parts, in particular if the two magnetic sensors of the magnetic sensor arrangement are SMD magnetic sensors, wherein in particular a first flux conductor of the first pair of flux conductors is geometrically identical to a first flux conductor of the second pair of flux conductors, or is an identical part, and a second flux conductor of the first pair of flux conductors is geometrically identical to a second flux conductor of the second pair of flux conductors. When SMD magnetic sensors are used, two different flux conductor geometries are in each case required per pair of flux conductors. If in each case two flux conductors of different pairs are identical, a potential cost reduction arises because of the reduced diversity of parts.

In an advantageous refinement of a torque sensor device according to the invention, in particular if the two magnetic sensors of the magnetic sensor arrangement are wired magnetic sensors, in particular the flux conductors of the first pair of flux conductors are arranged in the axial direction between the third stator and the first stator and the flux conductors of the second pair of flux conductors are arranged between the third stator and second stator, wherein the first magnetic sensor is arranged in particular between the two flux conductors of the first pair of flux conductors and the second magnetic sensor is arranged in particular between the two flux conductors of the second pair of flux conductors. This gives rise to a functionally advantageous arrangement which saves on construction space.

In an advantageous refinement of a torque sensor device according to the invention, in particular if the two magnetic sensors of the magnetic sensor arrangement are SMD magnetic sensors, the flux conductors in particular in each case have a collecting surface and a tab extending normally with respect to the centre axis and protruding radially outwards from the collecting surface, wherein in particular in each case the tabs of the flux conductors of a pair of flux conductors are arranged opposite one another and the associated magnetic sensor is in particular arranged in between.

In an advantageous refinement of a torque sensor device according to the invention, in particular if the two magnetic sensors of the magnetic sensor arrangement are SMD magnetic sensors, the collecting surface of the flux conductors extends in particular in each case normally with respect to the centre axis, i.e. in the radial direction and in the circumferential direction, wherein, in the case of the first flux conductors, the collecting surface and the tab are preferably arranged on different planes in the axial direction while, in the case of the second flux conductors, the tab lies in particular in each case in one plane with the associated collecting surface, wherein the second flux conductors are in particular L-shaped (tab arranged at the end of the collecting surface) or T-shaped (tab arranged in the centre of the collecting surface). In the case of the first flux conductors, the tab and the collecting surface are preferably connected by means of a connecting section extending in the axial direction, in order to compensate for the offset between the different planes. This makes it possible to achieve a functionally advantageous, but nevertheless simple configuration and arrangement of the flux conductors.

In an advantageous refinement of a torque sensor device according to the invention, the first flux conductor, in particular the collecting surface thereof, of the first pair of flux conductors is arranged in particular in the axial direction between first stator and the third stator, and the associated second flux conductor, in particular the collecting surface thereof, is arranged between the third stator and the second stator. The first flux conductor of the second pair of flux conductors, in particular the collecting surface thereof, is arranged in particular between the second stator and the third stator, and the associated second flux conductor is arranged in particular between the third stator and the first stator.

Alternatively, the two outer flux conductors or else only one of the two can be arranged in the axial direction outside the first or second stator.

In an advantageous refinement of a torque sensor device according to the invention, one or more flux conductors can also have one or more further collecting surfaces which extend, for example, in the axial direction and circumferential direction and, in particular in the radial direction on the outside at the edge, can protrude over the stator body of the first or second stator or over the stator ring of the third stator. By this means, in a corresponding configuration, better focusing or concentration of the magnetic flux can be achieved, as a result of which the signal quality of at least one sensor signal can be improved.

In an advantageous refinement of a torque sensor device according to the invention, in particular if the two magnetic sensors of the magnetic sensor arrangement are SMD magnetic sensors, as an alternative to the previously described refinements, the collecting surface of at least one flux conductor, in particular of all of the flux conductors can in each case extend parallel to the centre axis of the stator arrangement, i.e. in the circumferential direction and in the axial direction, wherein, in this case, at least one collecting surface can be formed by a ring segment or ring casing segment extending only partially over the circumference or by a ring segment or ring casing segment extending virtually over the entire extent or by a ring or ring casing closed in the circumferential direction. In some applications, better focusing or concentration of the magnetic flux can be achieved by means of this arrangement.

In an advantageous refinement of a torque sensor device according to the invention, in particular a collecting surface of the first flux conductor of the first pair of flux conductors protrudes in particular in the axial direction over the edge of the stator body of the first stator. In some applications, better focusing or concentration of the magnetic flux can be achieved by means of this arrangement.

In an advantageous refinement of a torque sensor device according to the invention, in particular a collecting surface of the second flux conductor of the second pair of flux conductors protrudes in particular in the axial direction over the edge of the stator body of the second stator. In some applications, better focusing or concentration of the magnetic flux can be achieved by means of this arrangement.

In an advantageous refinement of a torque sensor device according to the invention, in particular the collecting surfaces of the second flux conductors of the first pair of flux conductors and of the second pair of flux conductors protrude in each case in particular in the axial direction over the edge of the stator ring of the third stator. In some applications, better focusing or concentration of the magnetic flux can be achieved by means of this arrangement.

The second flux conductors can also be combined in this case into a common flux conductor and can be formed in particular in one piece or integrally.

A method according to the invention for determining a torque applied to a shaft by means of a torque sensor device, in particular by means of a previously described torque sensor device according to the invention is characterized by the steps of:

detecting a first magnetic flux density by means of a first magnetic sensor and generating a first sensor signal,
detecting a second magnetic flux density by means of a second magnetic sensor and generating a second sensor signal,
calculating a difference from the first sensor signal and the second sensor signal, and determining the torque applied to the shaft in accordance with the difference calculated from the first sensor signal and the second sensor signal.

By means of such a method, in which the flux densities, in particular the changes thereof are generated by a relative movement between the magnetic arrangement and the stator arrangement, an interference caused by an external magnetic interference field present in the surroundings of the torque sensor device can be at least partially, in some cases also completely, compensated for, in a simple manner, in particular can be removed or can disappear by averaging, when a torque applied to a steering shaft of a motor vehicle is detected.

In an advantageous refinement of a method according to the invention, before the torque applied to the shaft is determined in accordance with the difference calculated from the first sensor signal and the second sensor signal, the calculated difference is divided by a factor of two. As a result, a comparable, in particular identical, useful signal to torque sensor devices known from the prior art is obtained in a simple manner, and therefore the control device of a torque sensor device known from the prior art and/or the previously used algorithms for determining the applied torque in accordance with the determined useful signal can be adopted, in particular unchanged.

The method is intended to be explained in more detail with reference to the following example:

when a torque applied to a shaft is detected by means of a torque sensor device according to the invention, two magnetic, symmetrical "useful fields" arise which are each characterized by the first magnetic flux or the second magnetic flux, and which are in each case identical in size and are oriented in an opposite direction. If there is an external magnetic interference field in the surroundings of the torque sensor device, it can generally be assumed with sufficient approximation that it is superimposed equally on both useful fields.

If the associated useful signals, i.e. the first and second sensor signals generated from the detected first and second magnetic fluxes, are in each case detected according to the invention, and a difference is formed from them, a portion caused by the external interference field is averaged out, which is simple to understand with reference to the following equations, in which: useful signal N1=X (mT), useful signal N2=−X (mT).

The interference signal S=Y (mT) is additively superimposed equally on both useful signals N1 and N2, which leads to the resulting individual signals N1s=X+Y (mT), N2s=−X+Y (mT).

If the interference S=Y (mT)=0, i.e. there is no interference, the following arises for the output signal, after a calculation of the difference: A=N1−N2=2X (mT).

If interference is superimposed, the following arises for the output signal, after a calculation of the difference: As=N1s−N2s=X+Y−(−X+Y)=2X (mT)=A, i.e. the interference portions have been averaged out and the output signal, despite the interference which is present, corresponds to the output signal without interference.

If this is also divided by 2, the result is A/2=X (mT), i.e. the pure, simple useful signal.

A stator according to the invention for a torque sensor device for detecting a torque applied to a shaft, in particular for detecting a torque applied to a steering shaft of a motor vehicle, in particular for a torque sensor device according to the invention, comprises a stator body extending in the radial direction and first tabs and second tabs, wherein the first tabs and second tabs each extend away from said stator body in opposite axial directions. With a stator of this type, a torque sensor device according to the invention can be formed in a particularly simple manner.

In an advantageous refinement of a torque sensor device according to the invention, the first tabs and the second tabs are formed in particular as a single piece with the stator body.

In an advantageous refinement of a torque sensor device according to the invention, the stator body is in particular in the shape of an annular disc and has a radially inner edge and a radially outer edge, wherein the first tabs and the second tabs in particular in each case extend away from the radially inner edge of the stator body, which is in the shape of an annular disc, in particular in opposite axial directions.

In an advantageous embodiment of a stator according to the invention, the first tabs and the second tabs are arranged in each case at least partially offset from one another, in particular in each case completely offset from one another, in the circumferential direction, or the first tabs and the second tabs are arranged at least partially overlapping, preferably completely overlapping, in the circumferential direction, in particular in alignment with one another in the axial direction.

A stator arrangement according to the invention for a torque sensor device for detecting a torque applied to a shaft, in particular for detecting a torque applied to a steering shaft of a motor vehicle, in particular for a torque sensor device according to the invention, has a first stator, a second stator and a third stator which are each arranged concentrically with respect to one another along a centre axis, wherein the third stator is arranged in the axial direction, with respect to the centre axis, between the first stator and the second stator, wherein the third stator is configured according to the invention. With a stator arrangement of this type, a torque sensor device according to the invention can be formed in a particularly simple manner.

The features described with respect to a torque sensor device and presented embodiments and advantages thereof apply correspondingly to a method according to the invention, to a stator according to the invention and to a stator arrangement according to the invention, and vice versa.

Further features of the invention emerge from the claims, the figures and the description of the figures. All of the features and combinations of features that are cited in the description above, and also the features and combinations of features that are cited in the description of the figures below and/or are shown in the figures alone, can be used not only in the respectively indicated combination but also in other combinations or on their own if they are technically feasible and in particular expedient.

The invention will now be explained in more detail on the basis of a plurality of preferred exemplary embodiments and with reference to the attached drawings.

Figure 2A:
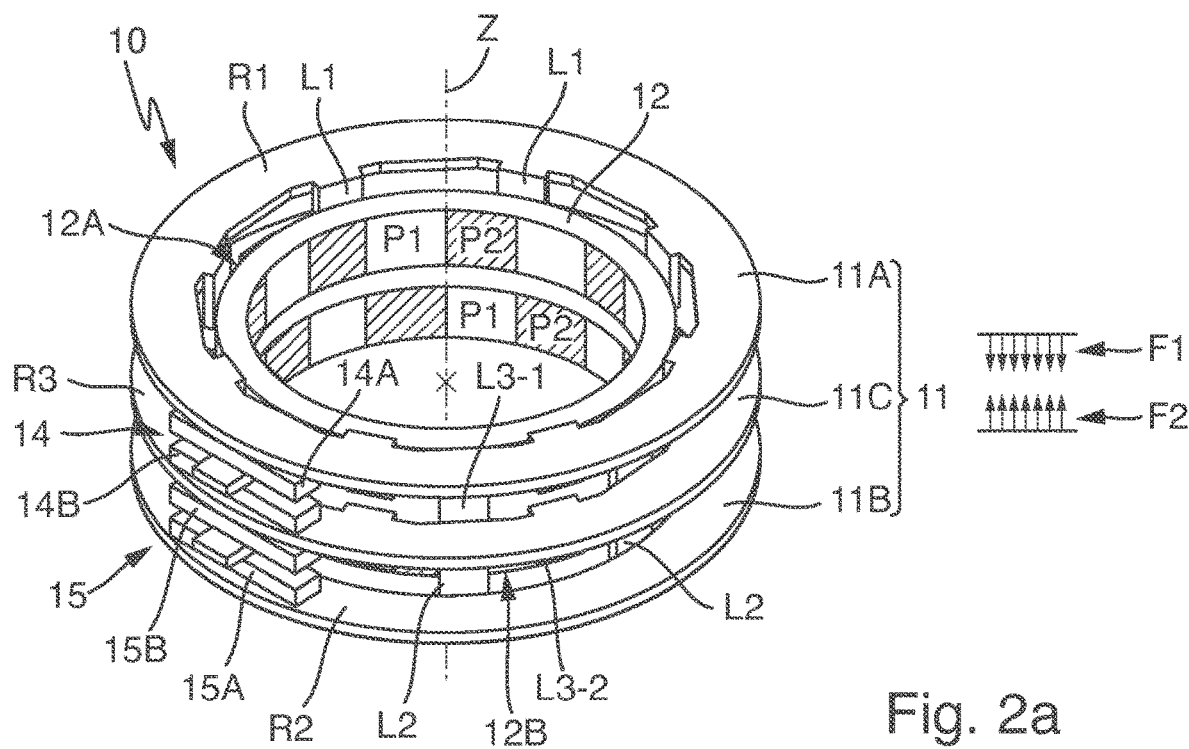
Figure 2B:
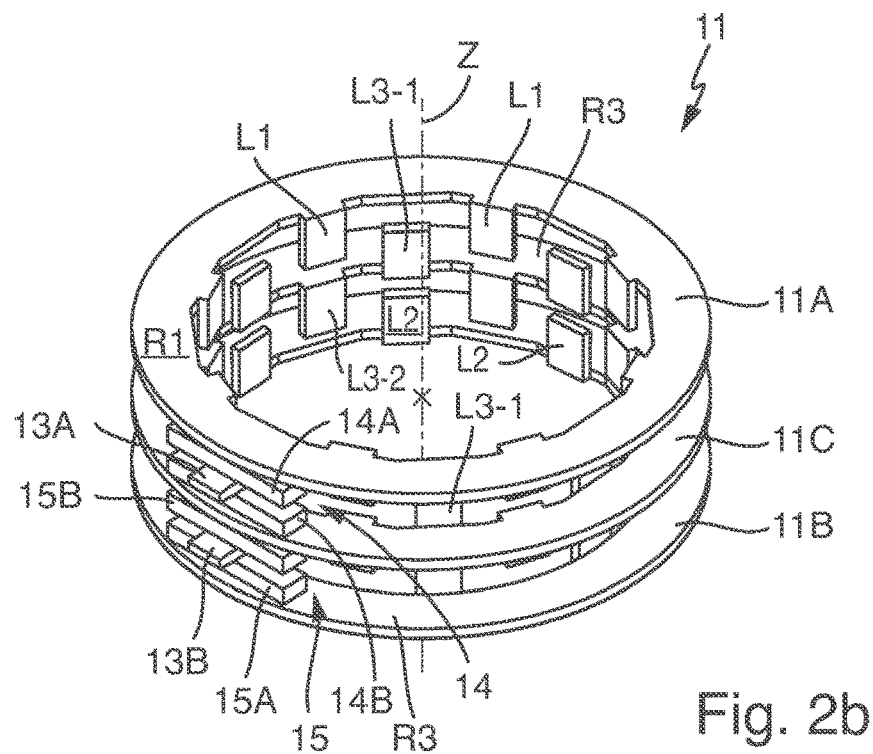
Figure 2C:
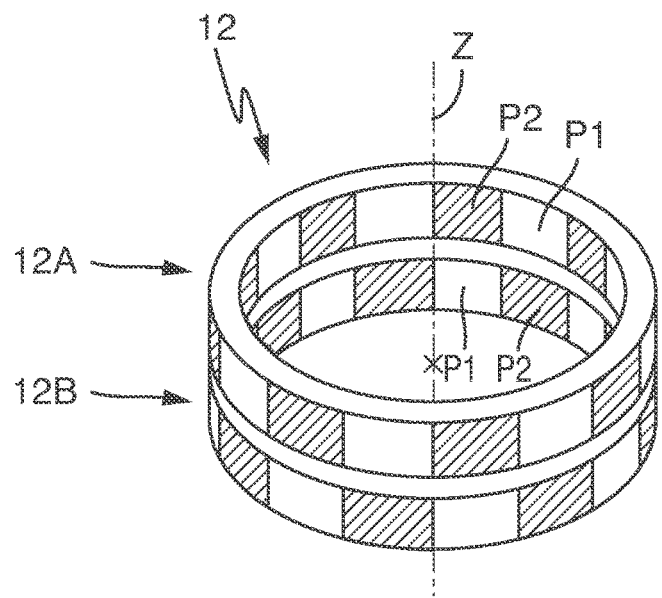
Figure 2D:
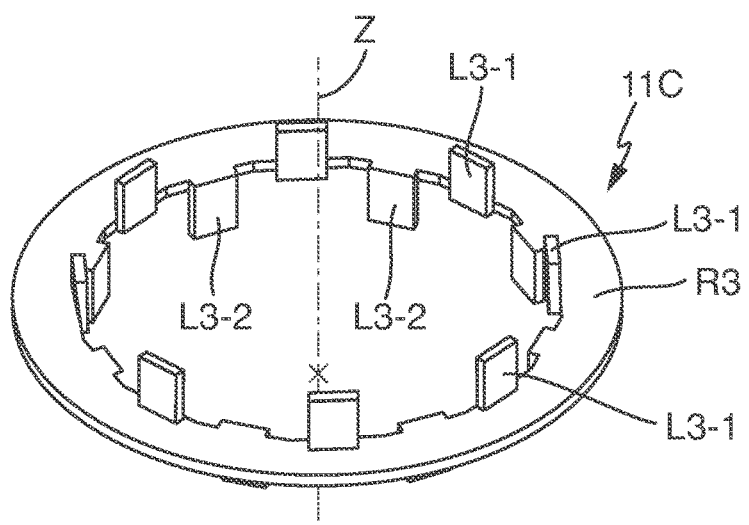
Figure 3A:
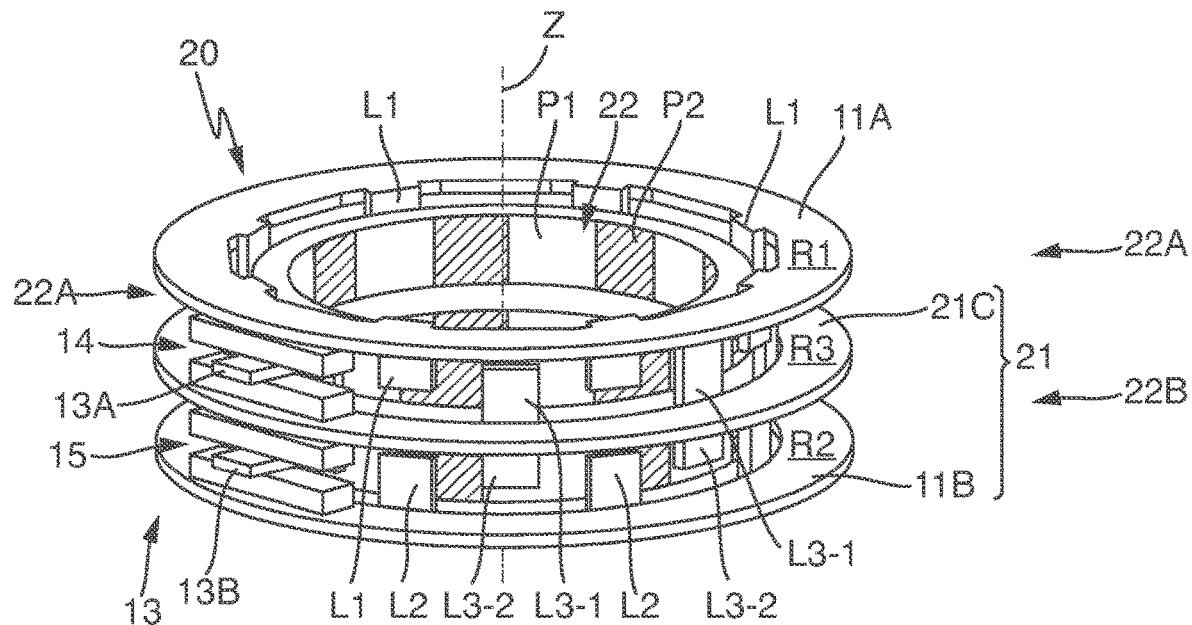
Figure 3B:
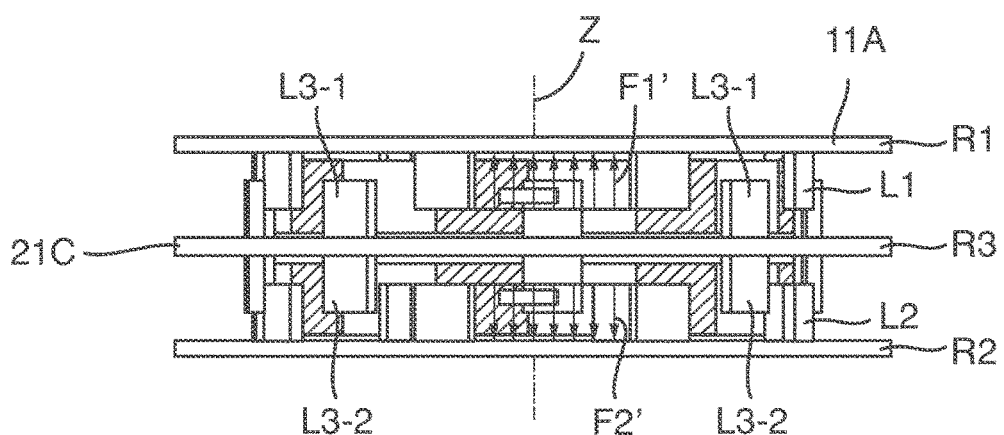
Figure 3C:
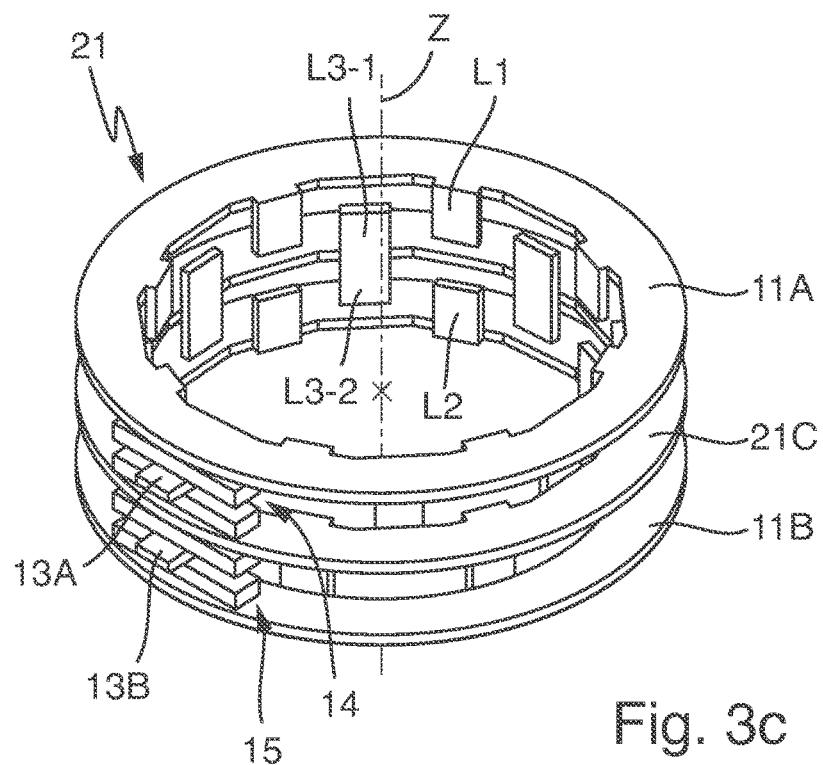
Figure 3D:
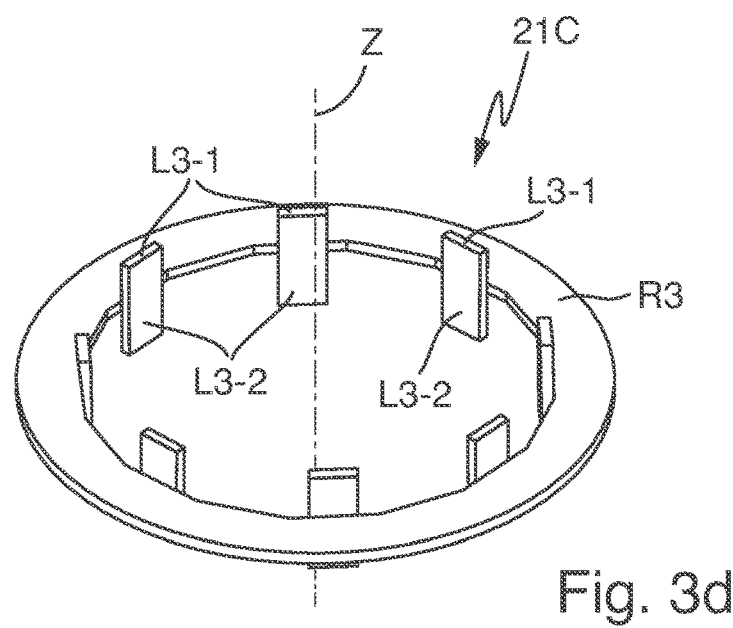
Figure 4:
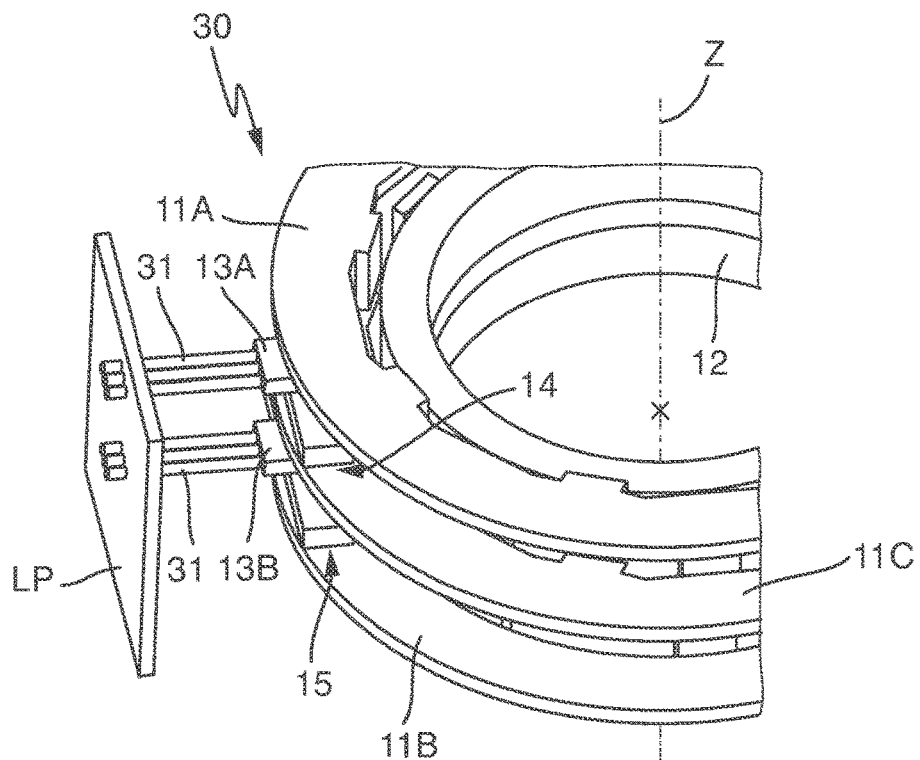
Figure 5:
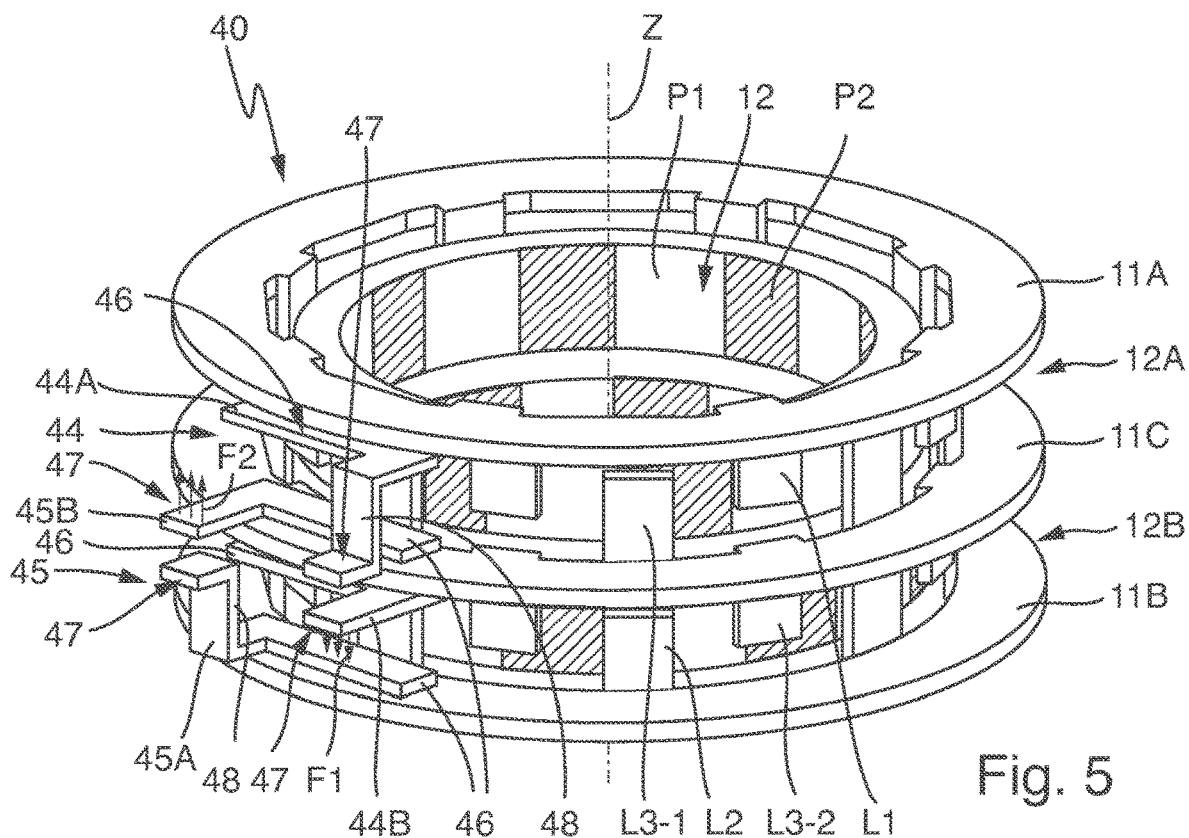
Figure 6:
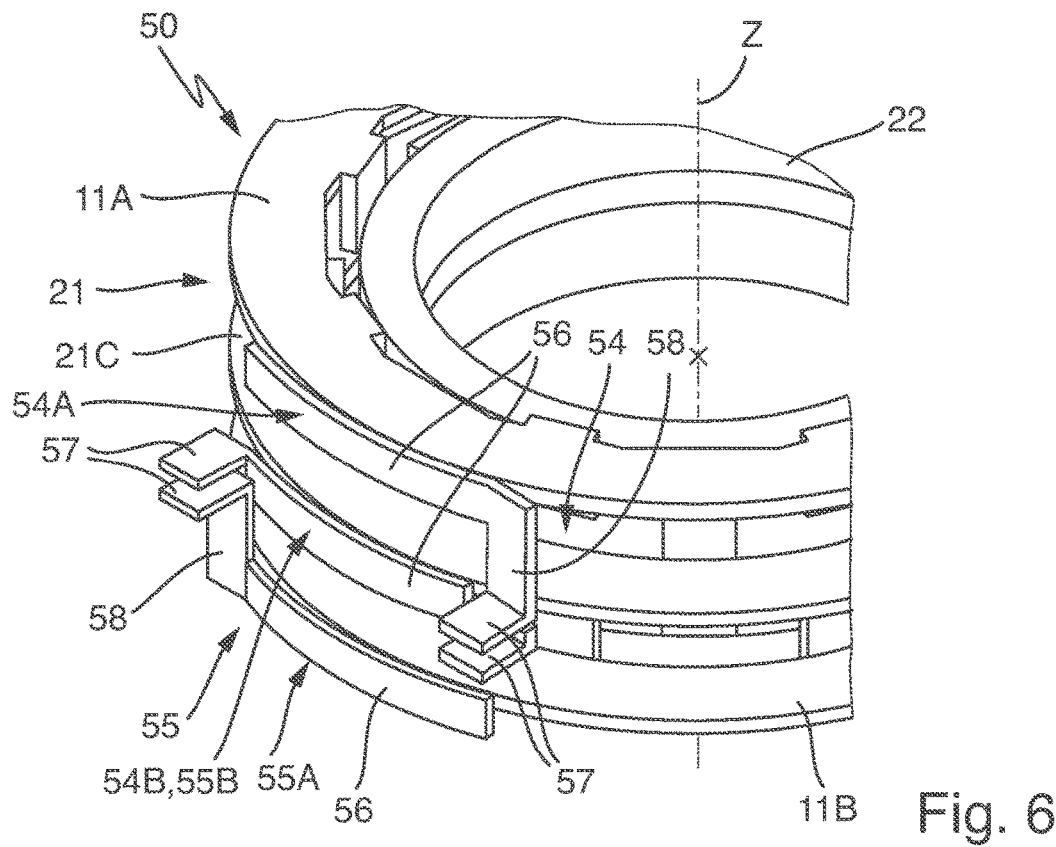
Figure 7:
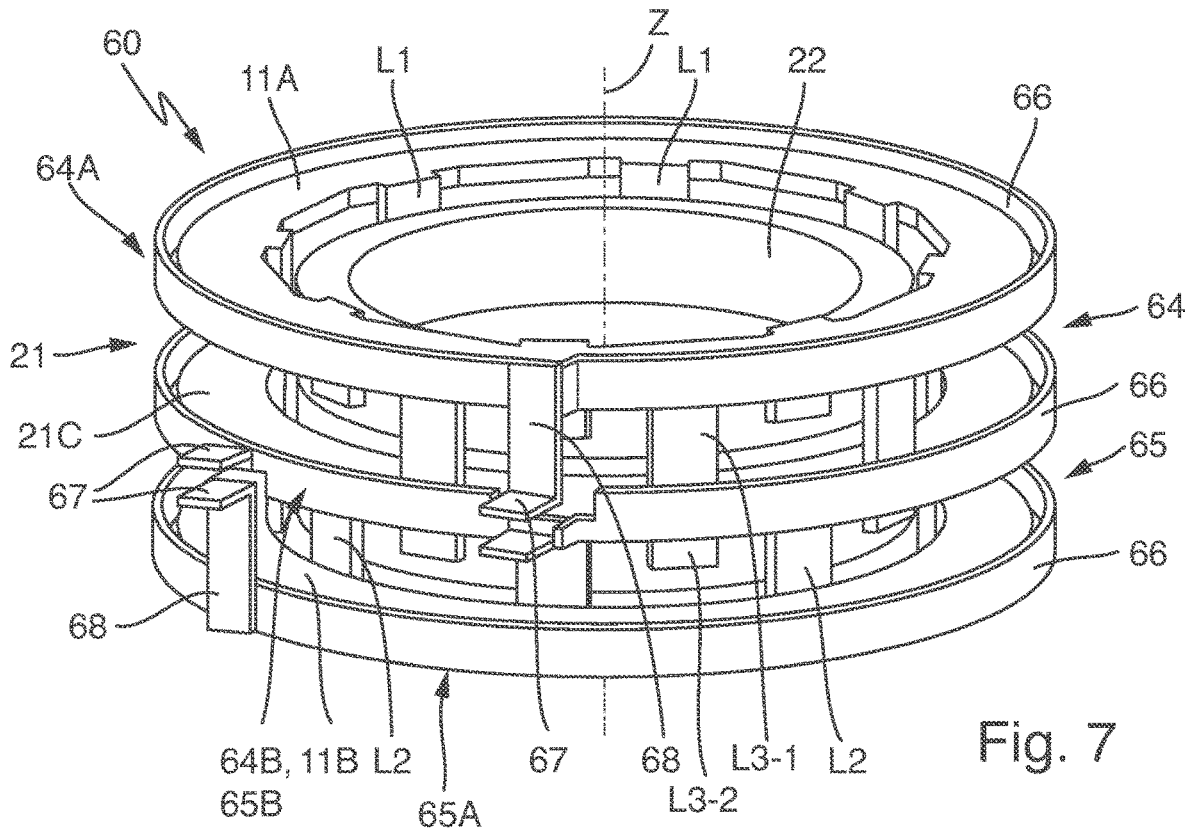

In the drawings, in each case schematically:

FIG. 1 shows a first exemplary embodiment of a torque sensor device according to the invention with a first exemplary embodiment of a stator arrangement according to the invention, with a first exemplary embodiment of a stator according to the invention, in a perspective illustration, FIG. 2a shows the torque sensor device from FIG. 1 in a more detailed, likewise perspective illustration than FIG. 1, but without the magnetic sensors, FIG. 2b shows the torque sensor device from FIG. 1 without the magnetic element, FIG. 2c shows the magnetic element of the torque sensor device from FIG. 2a in an illustration of individual parts, FIG. 2d shows the stator according to the invention from FIGS. 1 and 2a in an illustration of individual parts, in a perspective view, FIG. 3a shows a second exemplary embodiment of a torque sensor device according to the invention with a second exemplary embodiment of a stator arrangement according to the invention, with a second exemplary embodiment of a stator according to the invention, in a perspective illustration, FIG. 3b shows the torque sensor device from FIG. 3a in a side view, but without the flux conductors, FIG. 3c shows the torque sensor device from FIG. 3a without the magnetic element, FIG. 3d shows the stator according to the invention from FIG. 3a in an illustration of individual parts, in a perspective view, FIG. 4 shows a third exemplary embodiment of a torque sensor device according to the invention with magnetic sensors soldered to a printed circuit board, in a perspective illustration, FIG. 5 shows a fourth exemplary embodiment of a torque sensor device according to the invention, in a perspective illustration, FIG. 6 shows a fifth exemplary embodiment of a torque sensor device according to the invention, in a perspective illustration, and FIG. 7 shows a sixth exemplary embodiment of a torque sensor device according to the invention, in a perspective illustration.

FIG. 1 shows a first exemplary embodiment of a torque sensor device 10 according to the invention with a first exemplary embodiment of a stator arrangement 11 according to the invention, with a first exemplary embodiment of a stator 11C according to the invention, in a perspective illustration, wherein the torque sensor device 10 is configured for detecting a torque applied to a steering shaft (not illustrated here) of a motor vehicle and can be arranged concentrically with its centre axis Z with respect to the axis of rotation of the steering shaft and can be connected to the steering shaft in a manner basically known from the prior art, wherein the steering shaft has a first part and a second part which are in each case connected in the axial direction by means of a torsion bar and can thus be twisted in relation to each other by application of a torque. The torsion can be detected with the aid of the torque sensor device 10 according to the invention, and the torque applied to the shaft can be determined on the basis of said torsion.

The polygonal shape or contour, which can be seen in virtually all the figures, of the individual components serves only for graphical simplification purposes. The respective components preferably in each case have a circular contour.

The magnetic arrangement with the magnetic element 12, which is configured for generating a magnetic field, can be connected to the first part of the steering shaft for rotation therewith, while the stator arrangement 11 is configured for connection to the second part of the steering shaft for rotation therewith and can be connected to the second part of the steering shaft for rotation therewith via a stator holder, not illustrated here.

In order to detect the torque applied to the shaft, the torque sensor device 10 according to the invention has a magnetic arrangement with a single magnetic element 12 in this example, a stator arrangement 11 and a magnetic sensor arrangement 13.

The magnetic arrangement, in particular the magnetic element 12, and the stator arrangement 11 are movable here in the circumferential direction, i.e. about the centre axis Z relative to each other, and, according to the invention, are configured and arranged relative to each other in such a manner that, by means of a corresponding relative movement, in particular as a result of an application of a torque to the steering shaft, a first magnetic flux F1 with a first magnetic flux direction is generated and a second magnetic flux F2 with a second flux direction (cf. FIG. 2a) opposite to the first flux direction is generated, wherein the first flux can be detected by means of the first magnetic sensor 13A of the magnetic sensor arrangement 13 and the second magnetic flux by means of the second magnetic sensor 13B.

The magnetic element 12 is arranged here within the stator arrangement 11, in particular concentrically with respect thereto or to the centre axis Z of the torque sensor device 10, and with an air gap in between, wherein the magnetic element 12 extends here in the axial direction along the centre axis Z virtually over the entire length of the stator arrangement 11 which protrudes, merely at the edges, with reference to the illustration shown in FIG. 1, slightly upwards and slightly downwards over the magnetic element 12.

Alternatively, however, the magnetic element 12 can also be longer in the axial direction than the stator arrangement 11, i.e. can protrude at the top and/or bottom over the edges 11A/11B. This is advantageous particularly in a configuration according to FIG. 3 since a tolerance between stator element 11 and magnetic element 12 thus has no effect on the symmetry of the components.

The stator arrangement 11 according to FIG. 1 has a total of three stators: a first stator 11A, a second stator 11B and a third stator 11C, which are likewise arranged concentrically with respect to one another. The third stator 11C is arranged here in the axial direction, with respect to the centre axis Z, between the first stator 11A and the second stator 11B. All three stators 11A, 11B and 11C respectively have a stator body R1, R2 and R3 in the shape of an annular disc and tabs L1, L2, L3-1 and L3-2 which extend in each case away from said stator body in an axial direction.

The first stator 11A, precisely like the second stator 11B with the tabs L2, has tabs L1 extending in each case only in one direction, while the third stator 11C has, according to the invention, first tabs L3-1 which extend away from the stator body R3 in a first axial direction, and second tabs L3-2 which extend away from the stator body R3 in an opposite axial direction.

The tabs L1 and L2 of the first stator 11A and of the second stator 11B, respectively, extend in each case in the direction of the third stator 11C, the first tabs L3-1 of which extend in the direction of the first stator 11A and the second tabs L3-2 of which extend in the direction of the second stator 11B.

The individual tabs L1, L2, L3-1, L3-2 of the 3 stators 11A, 11B and 11C are in each case arranged distributed uniformly in the circumferential direction with corresponding spacings in between, wherein the first stator 11A and the second stator 11B each have 8 tabs which are distributed uniformly in the circumferential direction, while the third stator 11C has a total of 16 tabs L3-1 and L3-2, in particular 8 first tabs L3-1 and 8 second tabs L3-2, also see FIGS. 2a, 2b and 2d.

In this exemplary embodiment of a stator 11C according to the invention, the first tabs L3-1 and the second tabs L3-2 of the third stator 11C are arranged completely offset from one another and in each case in an alternating manner in the circumferential direction. The individual stators 11A, 11B and 11C are arranged here with respect to one another in such a manner that the tabs L1 of the first stator 11A and the first tabs L3-1 of the third stator 11C engage in a meshing manner in one another, as do the tabs 12 of the second stator 11B and the second tabs L3-2 of the third stator 11C.

In order to detect the first magnetic flux F1, which is generated between the first stator 11A and the third stator 11C, the first magnetic sensor 13A is provided, and in order to detect the second magnetic flux F2, which is generated between the second stator 11B and the third stator 11C, the second magnetic sensor 13B is provided, wherein, in this exemplary embodiment, the two magnetic sensors 13A and 13B are in each case wired magnetic sensors 13A and 13B which, for the electrical contact connection, in particular for the soldering to a printed circuit board, not illustrated in FIG. 1, have connection pins, likewise not illustrated in FIG. 1 (cf. FIG. 4: printed circuit board LP and connection pins 31).

Flux conductors 14A, 14B, 15A and 15B which in each case form pairs of flux conductors 14 and 15, respectively, are in each case provided for focusing or for amplifying, respectively, the magnetic fluxes F1, F2, wherein the first magnetic flux F1 is focused and amplified by means of the first pair of flux conductors 14 and is conducted to the first magnetic sensor 13A, and the second magnetic flux F2, which is detected by the second magnetic sensor 13B, by means of the second pair of flux conductors 15.

In this exemplary embodiment, all four flux conductors 14A, 14B, 15A, 15B are identical, i.e. are identical parts, and are in each case formed by rectangular, flat, plate-like segments which are arranged radially within the stator bodies R1, R2 and R3 in the shape of annular discs, in each case with an axial distance in between and in each case between the two associated stators 11A and 11C, and 11B and 11C. Alternatively, one or more of the flux conductors 14A, 14B, 15A and 15B could also be configured as curved segments, in particular with edges parallel to the stator bodies R1, R2 and R3.

In this case, the first magnetic sensor 13A and the second magnetic sensor 13B, since they are configured as wired magnetic sensors 13A and 13B, are arranged in each case in a sandwich-like manner in the axial direction between the two associated flux conductors 14A and 14B, and 15A and 15B, of the respectively associated pair of flux conductors 14 and 15, respectively.

FIG. 2a shows the torque sensor device 10 from FIG. 1 in a more detailed and also more perspective illustration than FIG. 1, but without the magnetic sensors 13A and 13B, with reference to which in particular the configuration of the stator arrangement 11, with the intermeshing tabs L1, L2, L3-1 and L3-2, and of the magnetic element 12 can be seen, especially in conjunction with FIGS. 2b to 2d.

FIG. 2b shows the torque sensor device 10 from FIG. 1 without the magnetic element 12, FIG. 2c shows the magnetic element 12 of the torque sensor device from FIG. 2a in an illustration of individual parts, and FIG. 2d shows the stator 11C according to the invention from FIGS. 1 and 2a in an illustration of individual parts, in a perspective view.

As can be readily seen with reference to FIGS. 2a and 2c, in this exemplary embodiment the magnetic element 12 is a closed ring magnet in the form of a permanent magnet with two axial sections 12A and 12B having a changing polarity P1 and P2, respectively, alternating in each case in the circumferential direction, wherein the two axial sections 12A and 12B are arranged offset from one another in the circumferential direction by a pole P1 and P2, respectively.

In conjunction with the stator arrangement 11, in particular in conjunction with a third stator 11C according to the invention, which is configured according to FIG. 2d and has first tabs L3-1 and second tabs L3-2 arranged offset from one another in the circumferential direction, a relative movement in the circumferential direction between the magnetic element 12, configured in the previously described manner, and the stator arrangement 11 causes the first magnetic flux F1 and the second magnetic flux F2 to be generated in each case with opposite directions, but with the same size, i.e. with the same magnitude, which is symbolized by way of example by the arrows or vectors on the right of the figure. The respective orientation of the vectors of the magnetic fluxes F1 and F2 depends on the direction of the relative movement in the circumferential direction between magnetic element 12 and stator arrangement 11. The vectors of the magnetic fluxes F1 and F2 thus show the relative movement with respect to each other in a first direction and the relative movement away from each other in a second direction.

This makes it possible, by means of a simple calculation of the difference between the sensor signals generated as a result of the respectively detected flux F1 and F2 by means of the magnetic sensors 13A and 13B, to average out and thus to remove an interference which is caused by an external magnetic interference field and has led in each case to an identical undesirable influencing of the first magnetic flux F1 and the second magnetic flux F2.

A second exemplary embodiment of a torque sensor device 20 according to the invention with a second exemplary embodiment of a stator arrangement 21 according to the invention, with a second exemplary embodiment of a stator 21C according to the invention, is explained below with reference to FIGS. 3a to 3b, wherein FIG. 3a shows this second exemplary embodiment of a torque sensor device 20 according to the invention in a perspective illustration.

FIG. 3b shows the torque sensor device 20 in a side view, but without the flux conductors 14, 15 and 14A, 14B, 15A, 15B. FIG. 3c shows the torque sensor device 20 in a side view, but in this case without the magnetic element 22, and FIG. 3d shows the stator according to the invention from FIG. 3a in an illustration of individual parts, in a perspective view.

In contrast to the torque sensor device 10 described previously by way of example, in the case of this torque sensor device 20 the magnetic element 22 has a constant polarity in the axial direction, and the first tabs L3-1 and the second tabs L3-2 of the third stator 21C are arranged in alignment in the circumferential direction.

In this case, a relative movement in the circumferential direction between the magnetic element 22 and the stator arrangement 21 causes the first magnetic flux F1' and the second magnetic flux F2' to likewise be generated according to the invention in each case with opposite directions and with the same size, i.e. with the same magnitude. This is symbolized by way of example by the arrows or vectors of the magnetic fluxes F1' and F2' in FIG. 3b. The respective orientation of the vectors of the magnetic fluxes F1' and F2' depends on the direction of the relative movement in the circumferential direction between magnetic element 12 and stator arrangement 11. The vectors of the magnetic fluxes F1' and F2' thus show the relative movement with respect to each other in a first direction and the relative movement away from each other in a second direction.

However, the opposite first and second flux directions also in this case, as in the previously described exemplary embodiment, make it possible to average out and thus to remove an interference caused by an external magnetic interference field by means of a simple calculation of the difference.

FIG. 4 shows a third exemplary embodiment of a torque sensor device 30 according to the invention with magnetic sensors 13A, 13B, which are soldered to a printed circuit board LP, in a perspective illustration, wherein it can readily be seen in this illustration that the connection pins 31 of the two magnetic sensors 13A and 13B are in each case guided radially outwards and are soldered to a printed circuit board LP arranged with its printed circuit board plane parallel to the centre axis Z.

FIG. 5 shows a fourth exemplary embodiment of a torque sensor device 40 according to the invention in a perspective illustration, but without magnetic sensors, wherein this torque sensor device 40 basically corresponds to the torque sensor device 10 from FIGS. 1 and 2a to 2d, but is configured for use with magnetic sensors in the form of SMD components, which requires flux conductors 44A, 44B, 45A and 45B configured geometrically differently and arranged differently. The remaining components are configured identically to the torque sensor device 10.

Here too, two flux conductors 44A and 44B and also 45A and 45B in each case again form a pair of flux conductors 44 and 45, respectively. However, the two flux conductors 44A and 44B of the first pair of flux conductors 44 are not both arranged this time between the first stator 11A and the third stator 11C; instead, the second flux conductor 44B is arranged on the stator body of the third stator 11C, on the side thereof facing away from the first stator 11A, and is fastened to said stator body.

Correspondingly, only the first flux conductor 45A of the second pair of flux conductors 45 is arranged between the second stator 11B and the third stator 11C, while the second flux conductor 45B of said second pair of flux conductors 45 is arranged on the stator body of the third stator 11C, on the side thereof facing away from the second stator 11B, and is fastened to said stator body.

In this case, only in each case the first flux conductors 44A and 45A are configured as identical parts, as are the second flux conductors 44B and 45B, wherein all the flux conductors 44A, 44B, 45A and 45B in each case have a collecting surface 46, which extends in the radial direction and in the circumferential direction, for collecting the magnetic flux F1 or F2, and a tab 47, which extends in a plane parallel to the collecting surface 46, for transmitting the magnetic flux F1 or F2 to associated magnetic sensors, wherein the associated magnetic sensors can each be arranged between the tabs 47 of the two flux conductors 44A and 44B, and 45A and 45B of the two pairs of flux conductors 44 and 45, respectively.

Since the torque sensor device 40 is configured for use of magnetic sensors which are in the form of SMD components and permit and/or require a different arrangement, the flux conductors 44A, 44B, 45A and 45B or the pairs of flux conductors 44 and 45 are in each case correspondingly configured.

So that the two magnetic sensors can be arranged in a common plane on a common printed circuit board, in particular on a printed circuit board which can be arranged with its printed circuit board plane oriented normally with respect to the centre axis Z, the collecting surface 46 and the tab 47 of the second flux conductors 44B and 45B are in each case arranged in a common plane, while the first flux conductors 44A and 45A between the collecting surface 46 and the tab 47 in each case have a connecting section 48 which extends in the axial direction and in each case connects the collecting surface 46, which is arranged in different planes, to the associated tab 47 of the respective first flux conductor 44B and 45B.

In this exemplary embodiment, the tabs 47 of the second flux conductors 44B and 45B are in each case arranged at one end of the collecting surfaces 46, thus resulting in an L-shaped geometry for the second flux conductors 44B and 45B. Alternatively, the tabs 47 could also be arranged in the centre of the collecting surface 46, thus resulting in a T-shaped geometry, with which, in some cases, better concentration or focusing of the magnetic flux can be achieved, since this in particular permits the use of larger collecting surfaces 46.

Alternatively or additionally, the collecting surfaces 46 can also protrude at the stator edge in each case in the axial direction, either only in one direction or in both, as in the exemplary embodiments in FIGS. 6 and 7.

FIG. 6 shows a fifth exemplary embodiment of a torque sensor device 50 according to the invention, in a perspective illustration, wherein this exemplary embodiment of a torque sensor device 50 according to the invention differs from the previously described exemplary embodiment only in the geometrical configuration and arrangement of the flux conductors 54A, 54B, 55A, and 55B.

Here too, two flux conductors 54A and 54B and also 55A and 55B in each case again form a pair of flux conductors 54 and 55, respectively. However, in this case, all the flux conductors 54A and 54B, and also 55A and 55B have a collecting surface 46 which extends axially and in the circumferential direction and is in each case formed by a casing segment extending only over part of the circumference and which protrudes over the edge of the respective adjacent stator body in each case in the axial direction on both sides. The configuration with tabs 57 and in each case a connecting section 58 extending in the axial direction is similar to the previously described torque sensor device 40.

The configuration of the flux conductors 54A and 54B, and also 55A and 55B, in particular the two inner, second flux conductors 54B and 55B, in the manner of a casing segment makes it possible to combine said two flux conductors 54B and 55B to form a component, i.e. a single-piece or integral configuration, and therefore nominally only three flux conductors are still required, which reduces the outlay on installation of the torque sensor device 50 in comparison to the previously described torque sensor devices 10, 20, 30 and 40 with in each case four flux conductors to be fastened.

FIG. 7 shows a sixth exemplary embodiment of a torque sensor device 60 according to the invention, in a perspective illustration, wherein this exemplary embodiment is based on the torque sensor device 20 from FIGS. 3a to 3d but, in contrast thereto, is configured for the arrangement of SMD magnetic sensors and, for this purpose, has correspondingly configured flux conductors 64A and 64B, and also 65A and 65B which differ from the torque sensor device 50 explained with reference to FIG. 6 to the effect that the collecting surfaces 66 of the flux conductors 64A and 64B, and also 65A and 65B are configured to be completely encircling, i.e. over an angle of 360°. Improved focusing of the magnetic fluxes can thereby be achieved.

In some cases, it can be advantageous or required, in particular necessitated by production, alternatively to provide a small gap in the circumferential direction and to form the collecting surfaces in particular only over a circumferential angle of 358° or at most 355° or even at most only 350°, or, as previously described, only over a significantly smaller angular range of, for example, 30° to 60°.

Otherwise, the flux conductors 64A and 64B, and also 65A and 65B are configured substantially similarly to the flux conductors 54A and 54B, and also 55A and 55B from FIG. 6 and have likewise corresponding tabs 67, and the first flux conductors 64A and 65A also have corresponding connecting sections 68.

LIST OF REFERENCE DESIGNATIONS

- 10, 20, 30, 40, 50, 60 torque sensor device according to the invention
- 11, 21 stator arrangement according to the invention
- 11A first stator
- 11B second stator
- 11C, 21C third stator, stator according to the invention
- 12, 22 magnetic element
- 12A first axial section of the magnetic element
- 12B second axial section of the magnetic element
- 13 magnetic sensor arrangement
- 13A first magnetic sensor
- 13B second magnetic sensor
- 14, 44, 54, 64 first pair of flux conductors
- 14A, 44A, 54A, 64A first flux conductor of the first pair of flux conductors
- 14B, 44B, 54B, 64B second flux conductor of the first pair of flux conductors
- 15, 45, 55, 65 second pair of flux conductors
- 15A, 45A, 55A, 65A first flux conductor of the second pair of flux conductors
- 15B, 45B, 55B, 65B second flux conductor of the second pair of flux conductors
- 31 connection pins
- 46, 56, 66 collecting surface
- 47, 57, 67 tab
- 48, 58, 68 connecting section
- F1, F1' first magnetic flux
- F2, F2' second magnetic flux
- L1 tabs of the first stator
- L2 tabs of the second stator
- L3-1 first tabs of the third stator
- L3-2 second tabs of the third stator
- LP printed circuit board
- P1 magnetic segment with first polarity
- P2 magnetic segment with second polarity
- R1 stator body in the shape of an annular disc of the first stator
- R2 stator body in the shape of an annular disc of the second stator
- R3 stator body in the shape of an annular disc of the third stator
- Z centre axis

The invention claimed is:

1. A torque sensor device for detecting a torque applied to a steering shaft of a motor vehicle, comprising:
   a magnetic arrangement, a stator arrangement and a magnetic sensor arrangement,
   wherein the magnetic arrangement is configured for generating at least one magnetic field,
   wherein a magnetic flux can be generated in the stator arrangement,
   wherein the magnetic arrangement and the stator arrangement are movable relative to each other in a circumferential direction,
   wherein the magnetic arrangement and the stator arrangement are configured and arranged relative to each other so that, by a relative movement between the magnetic arrangement and the stator arrangement in the circumferential direction about a centre axis of the torque sensor device, a first magnetic flux with a first magnetic flux direction and a second magnetic flux with a second flux direction opposite to the first flux direction can be generated in the stator arrangement,
   wherein the stator arrangement is configured to conduct the first magnetic flux generated in the stator arrangement and the second magnetic flux generated in the stator arrangement to the magnetic sensor device,
   wherein the magnetic sensor arrangement comprises a first magnetic sensor for detecting the first magnetic flux and a second magnetic sensor for detecting the second magnetic flux,
   wherein the stator arrangement has a first stator, a second stator and a third stator, including only one stator body, which are each arranged concentrically with respect to one another along the centre axis,
   wherein the third stator is arranged in an axial direction, with respect to the centre axis of the stator arrangement, between the first stator and the second stator, and
   wherein, by a relative movement between the magnetic arrangement and the stator arrangement in the circumferential direction, the first magnetic flux with the first magnetic flux direction is generated between the first stator and the third stator in the stator arrangement and the second magnetic flux with the second flux direction opposite to the first flux direction and with the same magnitude to the first magnetic flux can be generated between the second stator and the third stator in the stator arrangement.

2. The torque sensor device according to claim 1, wherein the first stator and the second stator each comprise a stator body in a shape of an annular disc and tabs which extend in each case away from the associated stator body in the axial direction, wherein the first stator and the second stator are configured and arranged in such a manner that the tabs of the first stator and of the second stator each extend in the axial direction from the associated stator body in the direction of the third stator.

3. The torque sensor device according to claim 1, wherein the third stator comprises a stator ring and first tabs and second tabs, wherein the first tabs and second tabs each extend away from the stator ring of the third stator in opposite axial directions.

4. The torque sensor device according to claim 3, wherein the first tabs and the second tabs of the third stator are arranged in each case at least partially offset from one another, in each case completely offset from one another, in the circumferential direction.

5. The torque sensor device according to claim 3, wherein the first tabs and the second tabs of the third stator are arranged at least partially overlapping in the circumferential direction, in alignment with one another in the axial direction.

6. The torque sensor device according to claim 1, wherein first tabs of the third stator are arranged offset from tabs of the first stator in the circumferential direction and engage in a meshing manner in spacings between the tabs of the first stator, and/or second tabs of the third stator are arranged offset from tabs of the second stator in the circumferential direction and engage in a meshing manner in spacings between the tabs of the second stator.

7. The torque sensor device according to claim 1, wherein a stator ring of the third stator is formed by a stator body which is arranged concentrically with respect to the centre axis, extends in a radial direction and is in a shape of an annular disc, and first tabs of the third stator and second tabs of the third stator extend away from said stator body.

8. The torque sensor device according to claim 1, wherein the magnetic arrangement has a magnetic element which extends in the axial direction, over an entire axial length of the third stator.

9. The torque sensor device according to claim 1, wherein a polarity of the magnetic arrangement, in particular of the at least one magnetic element, is constant in the axial direction.

10. The torque sensor device according to claim 9, wherein the third stator comprises first tabs and second tabs of which are arranged completely overlapping in the circumferential direction, in alignment with one another in the axial direction, wherein the first tabs and the second tabs of the third stator in each case at least partially overlap sections of different polarity in particular in the circumferential direction.

11. The torque sensor device according to claim 1, wherein the magnetic arrangement has a first section extending in the axial direction and a second section-extending in the axial direction, wherein, at least one position in the circumferential direction of the magnetic arrangement, or at each position in the circumferential direction, the polarity of the first axial section at this position is opposite to the polarity of the second axial section at this position.

12. The torque sensor device according to claim 11, wherein the third stator comprises first tabs and second tabs of which are arranged in each case at least partially offset from one another, or in each case completely offset from one another, in the circumferential direction, wherein the first tabs and the second tabs of the third stator in each case at least partially overlap sections of different polarity in the circumferential direction.

13. The torque sensor device according to claim 11, wherein the first axial section and the second axial section abut each other in the axial direction and are part of a common magnetic element.

14. The torque sensor device according to claim 1, wherein at least one magnetic sensor of the magnetic sensor arrangement, or both magnetic sensors, is/are a wired magnetic sensor with connection pins, wherein the magnetic sensor is arranged in the axial direction between the third stator and one of the other two stators, and is arranged in such a manner that the connection pins point outwards in a radial direction.

15. The torque sensor device according to claim 1, wherein at least one magnetic sensor of the magnetic sensor arrangement, or both magnetic sensors, is/are an Surface-Mounted Device (SMD) magnetic sensor, wherein the magnetic sensor is arranged in an axial direction level with the third stator and is arranged on a printed circuit board which is arranged with its printed circuit board plane oriented normally with respect to the centre axis of the stator arrangement.

16. The torque sensor device according to claim 1, further comprising:
a first pair of flux conductors with two flux conductors for focusing, for amplifying, and for transmitting the first magnetic flux to the magnetic sensor arrangement to the first magnetic sensor; and
a second pair of flux conductors with two flux conductors for focusing, for amplifying, and for transmitting the second magnetic flux to the magnetic sensor arrangement and to the second magnetic sensor,
wherein at least two of the flux conductors are geometrically identical or are identical parts.

17. A method for determining a torque applied to a shaft by a torque sensor device which is configured according to claim 1, the method comprising:
detecting a first magnetic flux density by the first magnetic sensor and generating a first sensor signal,
detecting a second magnetic flux density by the second magnetic sensor and generating a second sensor signal simultaneously;
calculating a difference from the first sensor signal and the second sensor signal; and
determining the torque applied to the shaft in accordance with the difference calculated from the first sensor signal and the second sensor signal.

18. The method according to claim 17, wherein, before the torque applied to the shaft is determined in accordance with the difference calculated from the first sensor signal and the second sensor signal, the calculated difference is divided by a factor of two.

19. A stator for a torque sensor device for detecting a torque applied to a shaft, for detecting a torque applied to a steering shaft of a motor vehicle, for a torque sensor device which is configured according to claim 1, the stator comprising:
the stator body extending in a radial direction and first tabs and second tabs, wherein the first tabs and second tabs each extend away from said stator body in opposite axial directions.

20. The stator according to claim 19, wherein the first tabs and the second tabs are arranged in each case at least partially offset from one another, or in each case completely offset from one another, in the circumferential direction, or wherein the first tabs and the second tabs are arranged at least partially overlapping, in the circumferential direction, in alignment with one another in the axial direction.

21. A stator arrangement for a torque sensor device for detecting a torque applied to a shaft, for detecting a torque applied to a steering shaft of a motor vehicle, for a torque sensor device according to claim 1,
wherein the stator arrangement has the first stator, the second stator and the third stator which are each arranged concentrically with respect to one another along a centre axis,
wherein the third stator is arranged in the axial direction, with respect to the centre axis, between the first stator and the second stator,
wherein the third stator comprises a stator body extending in a radial direction and first tabs and second tabs, wherein the first tabs and second tabs each extend away from said stator body in opposite axial directions.

* * * * *